United States Patent
Wang et al.

(10) Patent No.: US 10,496,147 B2
(45) Date of Patent: Dec. 3, 2019

(54) ENERGY REGULATION CIRCUIT AND OPERATION SYSTEM UTILIZING THE SAME

(71) Applicant: VIA TECHNOLOGIES, INC., New Taipei (TW)

(72) Inventors: Tze-Shiang Wang, New Taipei (TW); Chih-Wen Chu, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 264 days.

(21) Appl. No.: 15/647,460

(22) Filed: Jul. 12, 2017

(65) Prior Publication Data

US 2018/0039312 A1    Feb. 8, 2018

Related U.S. Application Data

(60) Provisional application No. 62/373,405, filed on Aug. 11, 2016, provisional application No. 62/371,310, (Continued)

(30) Foreign Application Priority Data

Apr. 28, 2017    (TW) .............................. 106114237 A

(51) Int. Cl.
    *G06F 1/26*    (2006.01)
    *G05F 1/56*    (2006.01)
    (Continued)

(52) U.S. Cl.
    CPC ................ *G06F 1/266* (2013.01); *G05F 1/56* (2013.01); *G05F 1/571* (2013.01); *G06F 1/28* (2013.01); *G06F 13/122* (2013.01); *H02M 5/293* (2013.01)

(58) Field of Classification Search
    CPC .......... G05F 1/56; G05F 1/571; G06F 13/122; G06F 1/266; G06F 1/28; G06F 1/26; H02M 5/293
    See application file for complete search history.

(56) References Cited

U.S. PATENT DOCUMENTS

| 5,734,258 A | 3/1998 | Esser |
| 7,102,251 B2 | 9/2006 | West |

(Continued)

FOREIGN PATENT DOCUMENTS

| CN | 2393251 Y | 8/2000 |
| CN | 1773425 A | 5/2006 |

(Continued)

OTHER PUBLICATIONS

Chinese language office action dated Jun. 25, 2018, issued in application No. CN 201710337415.1.

(Continued)

*Primary Examiner* — Fahmida Rahman

(74) *Attorney, Agent, or Firm* — McClure, Qualey & Rodack, LLP

(57) ABSTRACT

An energy regulation circuit is provided. A first voltage regulator adjusts an input voltage to generate an adjustment voltage. A first energy storage is charged according to the input voltage or the adjustment voltage. A first switch is coupled to the first energy storage. A second energy storage is coupled to the first switch. When the first switch is turned on, the second energy storage is coupled to the first energy storage in parallel. When the first switch is turned off, a second voltage regulator generates an operation voltage according to the voltage stored in the first energy storage. When the first switch is turned on, the second voltage regulator generates the operation voltage according to the (Continued)

voltages stored in the first and second energy storages. A controller operates according to the operation voltage.

18 Claims, 7 Drawing Sheets

Related U.S. Application Data filed on Aug. 5, 2016, provisional application No. 62/371,305, filed on Aug. 5, 2016.

(51) Int. Cl.
*G05F 1/571* (2006.01)
*G06F 1/28* (2006.01)
*G06F 13/12* (2006.01)
*H02M 5/293* (2006.01)

(56) References Cited

U.S. PATENT DOCUMENTS

| | | | |
|---|---|---|---|
| 7,516,338 B2 | 4/2009 | Park | |
| 8,143,856 B2 | 3/2012 | Andrea et al. | |
| 8,493,032 B2 | 7/2013 | Krauer | |
| 2004/0263124 A1* | 12/2004 | Wieck | G06F 1/263 |
| | | | 320/128 |
| 2010/0219684 A1* | 9/2010 | Iino | G06F 1/30 |
| | | | 307/23 |
| 2013/0132746 A1 | 5/2013 | Chen et al. | |
| 2017/0126041 A1 | 5/2017 | Sato | |

FOREIGN PATENT DOCUMENTS

| | | |
|---|---|---|
| CN | 201298744 Y | 8/2009 |
| CN | 101715625 A | 5/2010 |
| CN | 104184200 A | 12/2014 |
| JP | 2001-268900 A | 9/2001 |
| TW | 200803145 A | 1/2008 |
| TW | 200826406 A | 6/2008 |
| TW | M470447 U | 1/2014 |
| TW | 201440399 A | 10/2014 |
| TW | 201445851 A | 12/2014 |
| TW | 201501458 A | 1/2015 |
| TW | M526106 U | 7/2016 |
| WO | 2016/013451 A1 | 1/2016 |

OTHER PUBLICATIONS

Chinese Office Action dated Mar. 21, 2019, issued in application No. CN 201710342186.2.
Chinese Office Action dated Jul. 1, 2019 in Chinese application No. 201710342186.2.

\* cited by examiner

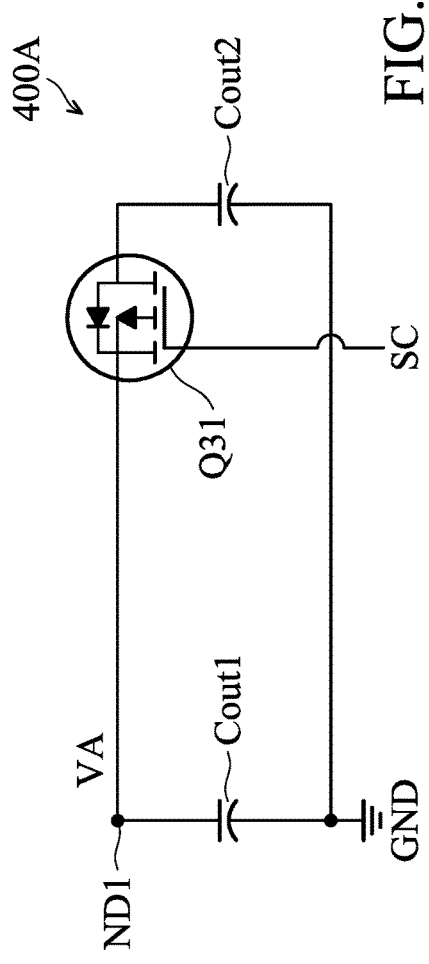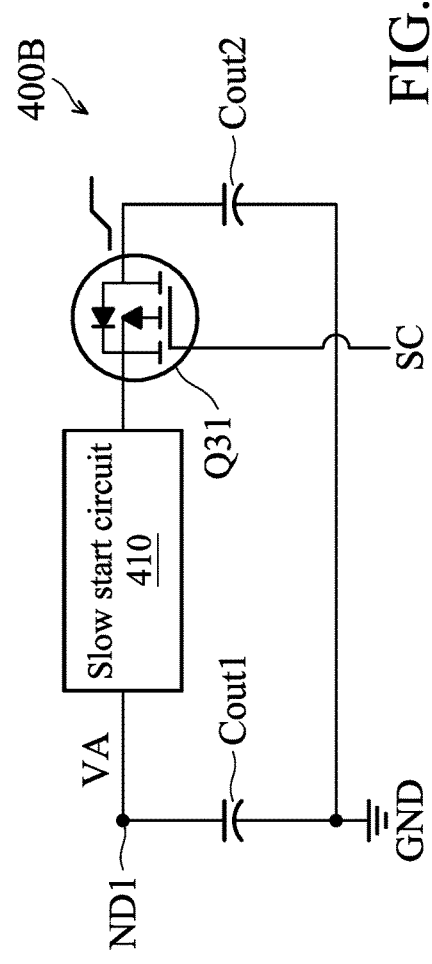
FIG. 4A
FIG. 4B

ENERGY REGULATION CIRCUIT AND OPERATION SYSTEM UTILIZING THE SAME

CROSS REFERENCE TO RELATED APPLICATIONS

This application claims the benefit of U.S. Provisional Application No. 62/371,305, filed on Aug. 5, 2016, U.S. Provisional Application No. 62/371,310, filed on Aug. 5, 2016, and U.S. Provisional Application No. 62/373,405, filed on Aug. 11, 2016, which are hereby incorporated by reference in their entirety.

This Application claims priority of Taiwan Patent Application No. 106114237, filed on Apr. 28, 2017, the entirety of which is incorporated by reference herein.

BACKGROUND OF THE INVENTION

Field of the Invention

The invention relates to an energy regulation circuit, and more particularly to an energy regulation circuit coupled between a host device and a peripheral device.

Description of the Related Art

A conventional energy regulation circuit adjusts an output voltage provided by a first external device to generate an adjustment result and provides the adjustment result to a second external device. However, the conventional energy regulation circuit cannot adjust the output voltage provided by the second external device to generate an adjustment result and then provide the adjustment result to the first external device.

BRIEF SUMMARY OF THE INVENTION

In accordance with an embodiment, an energy regulation circuit includes a first voltage regulator, a first energy accumulator, a first switch, a second energy accumulator, a second voltage regulator and a controller. The first voltage regulator adjusts an input voltage to generate an adjustment voltage. The first energy accumulator is charged according to the input voltage or the adjustment voltage. The first switch is coupled to the first energy accumulator. The second energy accumulator is coupled to the first switch. When the first switch is turned on, the second energy accumulator is connected to the first energy accumulator in parallel. The second voltage regulator is configured to generate an operation voltage according to a voltage stored in the first energy accumulator when the first switch is turned off. The second voltage regulator is configured to generate the operation voltage according to a sum of the voltage stored in the first energy accumulator and a voltage stored in the second energy accumulator when the first switch is turned on. The controller operates according to the operation voltage.

In accordance with another embodiment, an operation system includes a host device, a peripheral device, a transmission path and an energy regulation circuit. The host device is configured to provide a host voltage or receive a charging voltage. The peripheral device is configured to receive the host voltage or provide the charging voltage. The transmission path is coupled between the host device and the peripheral device to transmit the host voltage or the charging voltage. The energy regulation circuit is coupled between the host device and the peripheral device and includes a first voltage regulator, a first energy accumulator, a first switch, a second energy accumulator, a second voltage regulator and a controller. The first voltage regulator adjusts the charging voltage to generate an adjustment voltage. The first energy accumulator is charged according to the charging voltage or the adjustment voltage. The first switch is coupled to the first energy accumulator. The second energy accumulator is coupled to the first switch. When the first switch is turned on, the second energy accumulator is connected to the first energy accumulator in parallel. The second voltage regulator is configured to generate an operation voltage according to a voltage stored in the first energy accumulator when the first switch is turned off. The second voltage regulator is configured to generate the operation voltage according to a sum of the voltage stored in the first energy accumulator and a voltage stored in the second energy accumulator when the first switch is turned on. The controller operates according to the operation voltage.

BRIEF DESCRIPTION OF THE DRAWINGS

The invention can be more fully understood by referring to the following detailed description and examples with references made to the accompanying drawings, wherein:

FIG. 4A is a schematic diagram of another exemplary embodiment of a processor, according to various aspects of the present disclosure.

FIG. 4B is a schematic diagram of another exemplary embodiment of a processor, according to various aspects of the present disclosure.

DETAILED DESCRIPTION OF THE INVENTION

Figure 1:
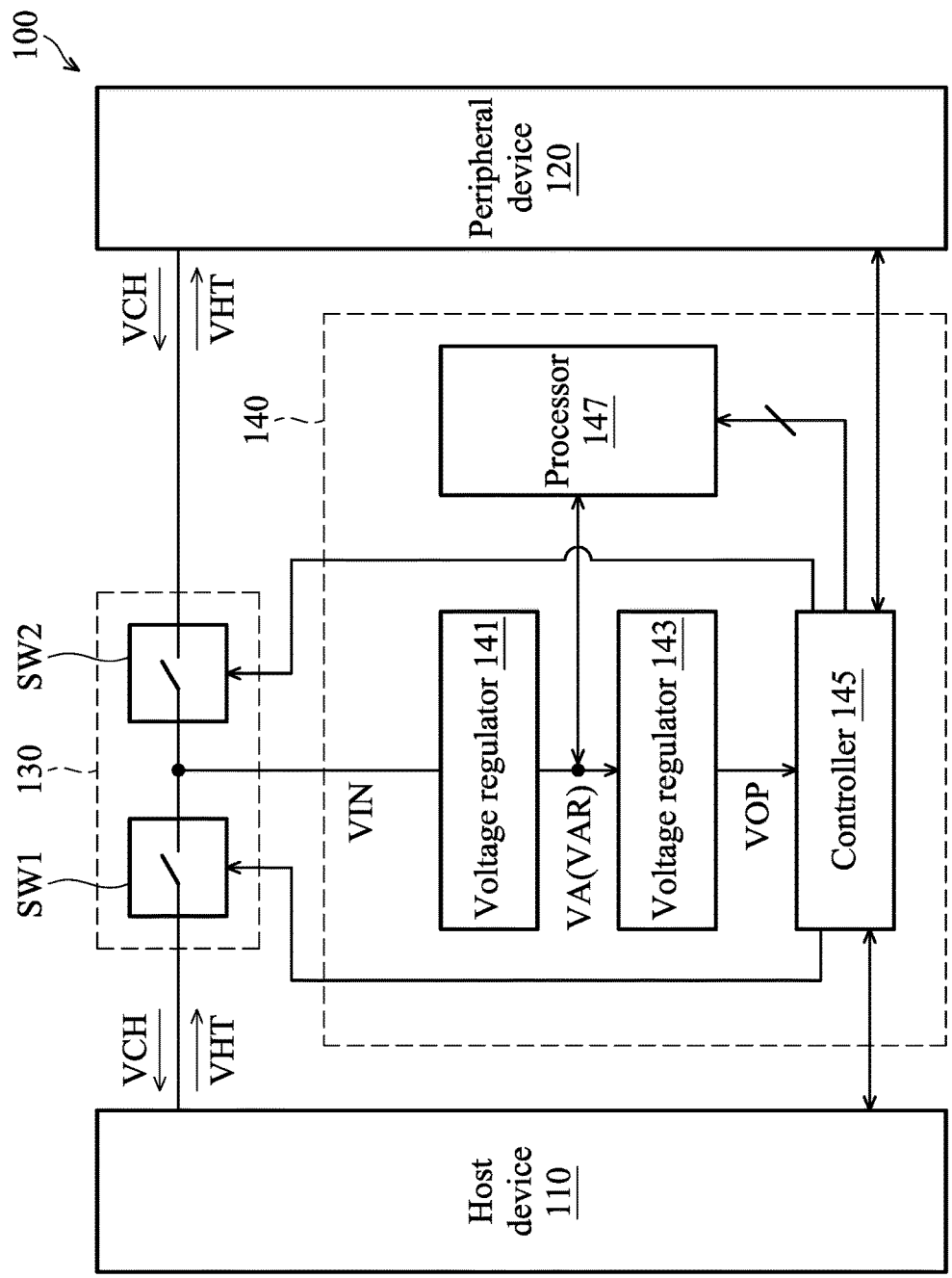
FIG. 1 is a schematic diagram of an exemplary embodiment of an operation system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system, according to various aspects of the present disclosure. The operation system 100 includes a host device 110, a peripheral device 120, a transmission path 130 and an energy regulation circuit 140. The host device 110 utilizes the transmission path 130 to output a host voltage VHT or receive a charging voltage VCH and communicates with the energy regulation circuit 140. In one embodiment, the host device 110 utilizes the energy regulation circuit 140 to transmit data to many peripheral devices. In this case, the host device 110 also utilizes the energy regulation circuit 140 to output the host voltage VHT to the many peripheral devices. In the present disclosure, the kind of host device 110 is not limited. In one embodiment, the host device 110 is a computer or a smart phone.

The peripheral device 120 is coupled to the transmission path 130 and the energy regulation circuit 140. In this embodiment, the peripheral device 120 utilizes the transmission path 130 to receive the host voltage VHT or output the charging voltage VCH. Additionally, the peripheral device 120 communicates with the energy regulation circuit 140. In FIG. 1, the energy regulation circuit 140 is coupled to a single peripheral device 120, but the disclosure is not limited thereto. In other embodiments, the energy regulation circuit 140 may be coupled to more peripheral devices. The type of peripheral device is not limited in the present disclosure. In one embodiment, the peripheral devices may include storage devices, display devices and/or chargers.

The transmission path 130 is coupled between the host device 110 and the peripheral device 120 and includes switches SW1 and SW2 configured to transmit the charging voltage VCH and the host voltage VHT. The kinds of switches SW1 and SW2 are not limited in the present disclosure. In one embodiment, each of the switches SW1 and SW2 is a transistor.

The energy regulation circuit 140 communicates with both the host device 110 and the peripheral device 120 to generate at least one communication result. Then, the energy regulation circuit 140 turns on at least one of the switches SW1 and SW2 according to the communication result. For example, when the peripheral device 120 is a charger, the energy regulation circuit 140 first turns on the switch SW2 and communicates with the host device 110 to determine which charging voltage the host device 110 needs. The energy regulation circuit 140 directs the peripheral device 120 to provide the charging voltage VCH which is needed by the host device 110. After the peripheral device 120 has output the charging voltage VCH needed by the host device 110, the energy regulation circuit 140 turns on the switch SW1 to transmit the charging voltage VCH to the host device 110. If the peripheral device 120 is not a charger, the energy regulation circuit 140 may turn on the switches SW1 and SW2 to supply power to the peripheral device 120. In another embodiment, the energy regulation circuit 140 may turn on the switch SW1 and turn off the switch SW2 so that no power is supplied to the peripheral device 120.

In this embodiment, the energy regulation circuit 140 includes voltage regulators 141 and 143, a controller 145, and a processor 147. The voltage regulator 141 adjusts an input voltage VIN to generate an adjustment voltage VA. In the present disclosure, the source providing the input voltage VIN is not limited. When the host device 110 provides the host voltage VHT, the input voltage VIN is about equal to the host voltage VHT. When the peripheral device 120 provides the charging voltage VCH, the input voltage VIN is about equal to the charging voltage VCH. The voltage regulator 143 adjusts the adjustment voltage VA to generate an operation voltage VOP. In the present disclosure, the circuit structures of the voltage regulators 141 and 143 are not limited. For example, one of the voltage regulators 141 and 143 is a boost circuit, and the other is a buck circuit.

In one embodiment, the voltage regulator 141 is a synchronous boost converter to increase the input voltage VIN. For example, if the input voltage VIN is 5V, the adjustment voltage VA generated by the voltage regulator 141 is 6.5V. When the input voltage VIN is 9V, the adjustment voltage VA is approximately 9V. When the input voltage VIN is 15V, the adjustment voltage VA is approximately 15V. When the input voltage VIN is 20V, the adjustment voltage VA is approximately 20V. In another embodiment, the voltage regulator 143 is a synchronous buck converter to reduce the adjustment voltage VA. For example, when the adjustment voltage VA is 6.5V, 9V, 15V or 20V, the operation voltage VOP is maintained at a fixed level, such as 5V.

The controller 145 starts communicate with the host device 110 and the peripheral device 120 according to the operation voltage VOP to generate at least one communication result. The controller 145 turns on at least one of the switches SW1 and SW2 and generates at least one control signal (not shown) according to the communication result. The processor 147 processes the adjustment voltage VA according to the control signal to generate a processed result, such as VAR. In one embodiment, the controller 145 is a power delivery controller.

For example, when the controller 145 determines that the host device 110 outputs the host voltage VHT, the controller 145 enters a first mode. In the first mode, the controller 145 turns on the switch SW1 and turns on or off the switch SW2 according to the requirement for the peripheral device 120. At this time, the controller 145 deactivates the processor 147. Therefore, the processor 147 does not process the adjustment VA. When the controller 145 determines that the peripheral device 120 provides the charging voltage VCH, the controller 145 enters a second mode. In the second mode, the controller 145 first turns on the switch SW2 and directs the peripheral device 120 to provide a charging voltage VCH appropriate for the host device 110. After the peripheral device 120 has output the appropriate charging voltage, the controller 145 turns on the switch SW1. At this time, the controller 145 generates at least one control signal (not shown) to the processor 147 according to the charging voltage VCH in the second mode. At this time, the processor 147 processes the adjustment voltage VA according to the control signal to generate a boost voltage VAR. The voltage regulator 143 generates the operation voltage VOP according to the boost voltage VAR.

Since the boost voltage VAR is higher than the adjustment voltage VA, when the peripheral device 120 is not coupled to the energy regulation circuit 140, the energy regulation circuit 140 is capable of maintaining the operation of other peripheral devices (not shown) until the host device 110 serves as a power supply and provides the host voltage VHT.

Furthermore, when the host device 110 or the peripheral device 120 is just coupled to the energy regulation circuit 140, the switches SW1 and SW2 may be not turned on. However, since each of the switches SW1 and SW2 includes a parasitic diode, the switch SW1 or SW2 can transmit the host voltage VHT or the charging voltage VCH to the energy regulation circuit 140. After receiving the host voltage VHT or the charging voltage VCH, the energy regulation circuit 140 is capable of controlling the switches SW1 and SW2 normally.

Figure 2:
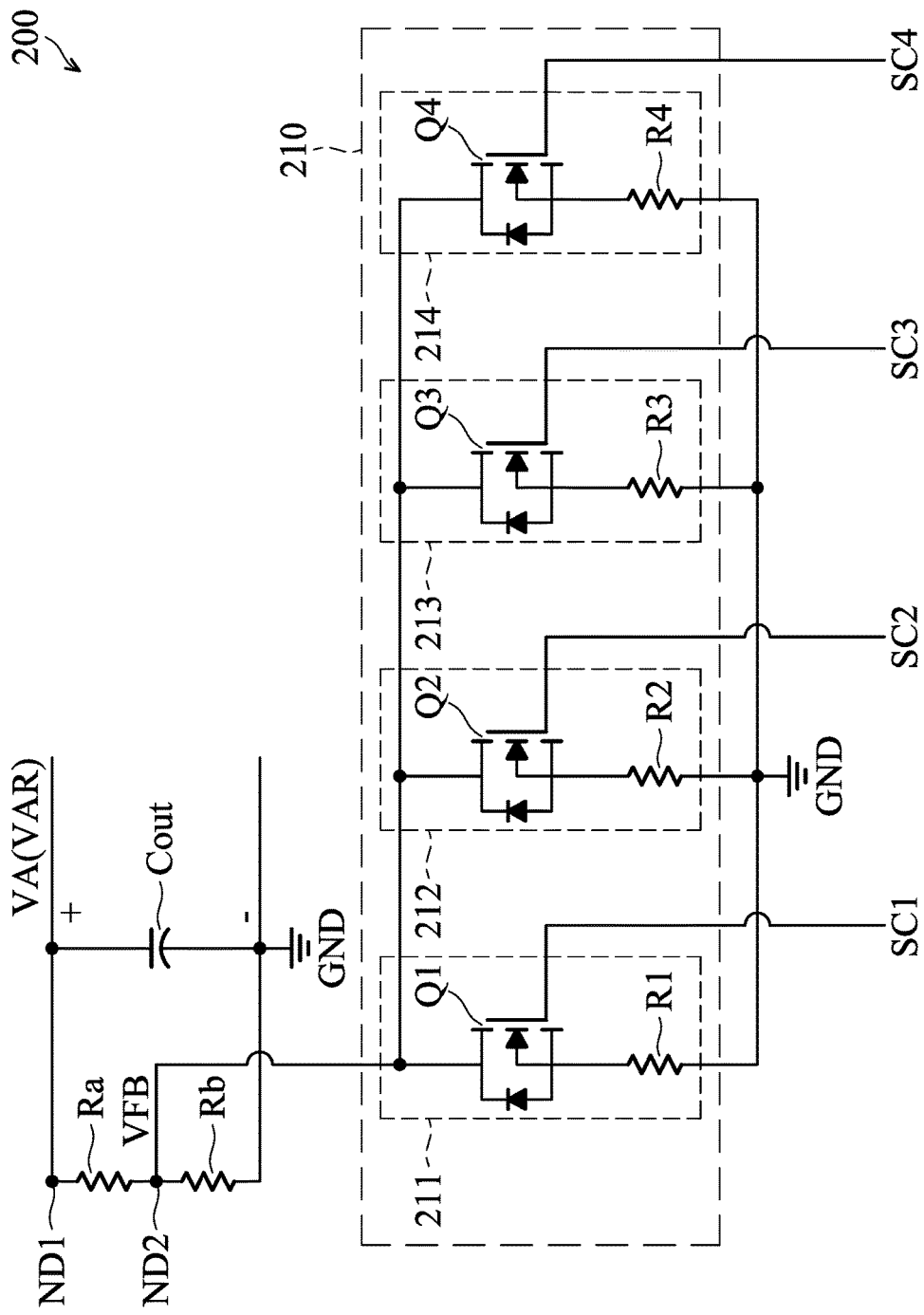
FIG. 2 is a schematic diagram of an exemplary embodiment of a processor, according to various aspects of the present disclosure.

FIG. 2 is a schematic diagram of an exemplary embodiment of a processor, according to various aspects of the present disclosure. The processor 200 includes resistors Ra and Rb, an energy accumulator Cout and an adjustment circuit 210. The resistor Ra is coupled between the nodes ND1 and ND2. The resistor Rb is coupled between the nodes ND2 and GND. The energy accumulator Cout is coupled between the nodes ND1 and GND. The kind of energy accumulator Cout is not limited in the present disclosure. In this embodiment, the energy accumulator Cout is a capacitor. The energy W stored in the energy accumulator Cout is expressed by the following equation (1):

$$W = \tfrac{1}{2}CV^2 \quad (1)$$

W represents the energy stored in the energy accumulator Cout, C is the capacitance of the energy accumulator Cout, and V is a voltage difference across the energy accumulator Cout.

Assume that the adjustment voltage VA is 6.5V in a first mode when the host device 110 provides the host voltage VHT. In this case, the energy W1 stored in the energy accumulator Cout is expressed by the following equation (2):

$$W = \tfrac{1}{2}C(6.5)^2 \quad (2)$$

The adjustment circuit 210 adjusts the feedback voltage VFB to increase the adjustment voltage VA and generates the boost voltage VAR in a second mode when the peripheral device 120 provides the charging voltage VCH. Assume that the boost voltage VAR is 15V. In this case, the energy W2 stored in the energy accumulator Cout is expressed by the following equation (3):

$$W = \tfrac{1}{2}C(15)^2 \quad (3)$$

According to equations (2) and (3), the energy stored in the energy accumulator Cout is increased in the second mode. Therefore, the energy stored in the energy accumulator Cout is capable of maintaining the operations of other peripheral devices when the peripheral device 120 does not provide power.

In the present disclosure, the structure of the adjustment circuit 210 is not limited. Any circuit can serve as the adjustment circuit 210, as long as the circuit is capable of adjusting the adjustment voltage VA. In this embodiment, the adjustment circuit 210 includes regulators 211~214. The regulators 211~214 are connected in parallel between the nodes ND2 and GND. Since the structures of the regulators 211~214 are the same, the regulator 211 is given as an example to describe the operation of the regulator. In other embodiments, the adjustment circuit 210 may include more or fewer regulators.

The regulator 211 includes switch Q1 and a set resistor R1. The switch Q1 is coupled to the node ND2. The kind of switch Q1 is not limited in the present disclosure. In this embodiment, the switch Q1 is an N-type transistor, but the disclosure is not limited thereto. In other embodiments, the switch Q1 may be a P-type transistor. As shown in FIG. 2, the gate of the switch Q1 receives a control signal SC1. The drain of the switch Q1 is coupled to the node ND2. The source of the switch Q1 is coupled to one terminal of the set resistor R1. The other terminal of the set resistor R1 is coupled to the node GND. When the switch Q1 is turned on, the set resistor R1 is connected to the resistor Rb in parallel. Therefore, the feedback voltage VFB is increased and the adjustment voltage VA is also increased. The increased adjustment voltage VA is provided as the boost voltage VAR.

In this embodiment, the resistances of the set resistors R1~R4 of the regulators 211~214 are different. Additionally, the switches Q1~Q4 of the regulators 211~214 are controlled by control signals SC1~SC4, respectively. The control signals SC1~SC4 are generated by the controller 145. In one embodiment, the controller 145 generates the control signals SC1~SC4 according to the charging voltage VCH provided by the peripheral device 120.

For example, when the charging voltage VCH is equal to a first pre-determined value (e.g. 5V), the controller 145 only turns on the switch Q1. Therefore, the set resistor R1 is connected to the resistor Rb in parallel. At this time, the boost voltage VAR may be equal to a first voltage, such as 15V. In another embodiment, when the charging voltage VCH is equal to a second pre-determined value (e.g. 9V), the controller 145 only turns on the switch Q2. Therefore, the set resistor R2 is connected to the resistor Rb in parallel. At this time, the boost voltage VAR may be equal to a second voltage, such as 18V. In some embodiments, when the charging voltage VCH is equal to a third pre-determined value (e.g. 15V) or a fourth pre-determined value (20V), the controller 145 only turns on the switch Q3 or Q4. Therefore, the set resistor R3 or R4 is connected to the resistor Rb in parallel. At this time, the boost voltage VAR may be equal to a third voltage (e.g. 21V) or equal to a fourth voltage (e.g. 24V).

Figure 3:
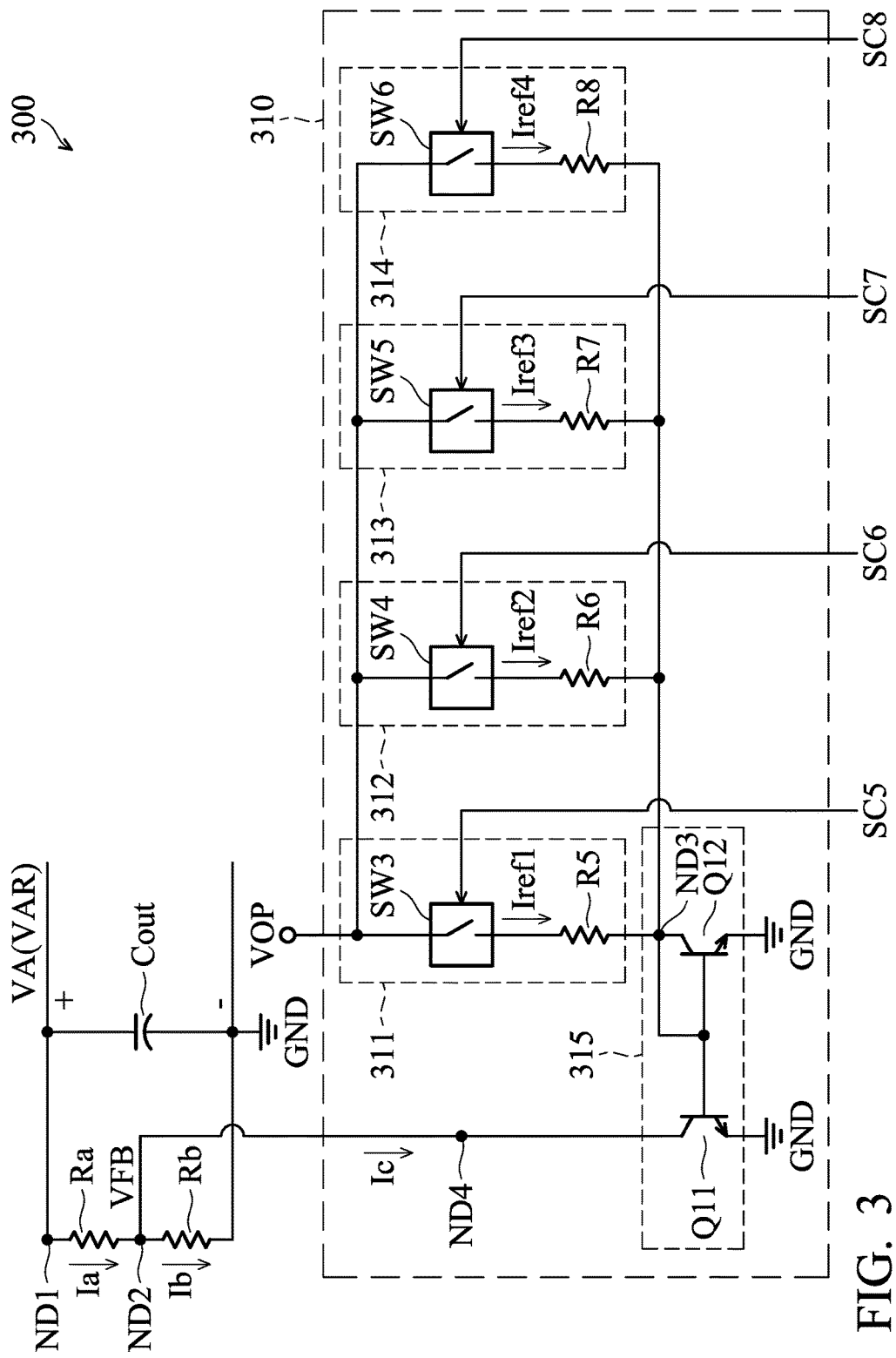
FIG. 3 is a schematic diagram of another exemplary embodiment of a processor, according to various aspects of the present disclosure.

FIG. 3 is a schematic diagram of another exemplary embodiment of a processor, according to various aspects of the present disclosure. FIG. 3 is similar to FIG. 2 except the adjustment circuit 310 shown in FIG. 3. The adjustment circuit 310 receives the operation voltage VOP and is coupled to the nodes ND2 and GND. In this embodiment, the adjustment circuit 310 includes regulators 311~314 and a current mirror 351. The regulators 311~314 are connected with each in parallel. Since the structures of the regulators 311~314 are the same, the regulator 311 is given as an example. In other embodiments, the adjustment circuit 310 may include more or fewer regulators.

The regulator 311 includes a switch SW3 and a set resistor R5. The switch SW3 receives the operation voltage VOP and is coupled to the set resistor R5. In one embodiment, the switch SW3 is a P-type transistor or an N-type transistor. The set resistor R5 is coupled between the switch SW3 and the input terminal ND3 of the current mirror 315. In this embodiment, the controller 145 generates the control signal SC5 to turn the switch SW3 on or off according to the input voltage VIN. When the switch SW3 is turned on, a reference voltage Iref1 passes through the set resistor R5. In this embodiment, the resistances of the set resistors R5~R8 are different. Therefore, when the switches SW3~SW6 are turned on, the reference currents Iref1~Iref4 passing through the resistors R5~R8 are different.

The current mirror 315 includes the input terminal ND3 and an output terminal ND4. The output terminal ND4 is coupled to the node ND2. In this embodiment, the current mirror 315 includes transistors Q11 and Q12. When an input current passes through the input terminal ND3, the current mirror 315 copies the input current to generate an output current, wherein the output current passes through the output terminal ND4 and is equal to the input current. For example, when the reference current Iref1 passes through the input terminal ND3, the current mirror 315 generates an output current Ic. Therefore, the current Ia passing through the resistor Ra is increased to increase the adjustment voltage VA which is used for generating the boost voltage VAR.

In this embodiment, the controller 145 generates the control signals SC5~SC8 according to the charging voltage VCH to turn on one of the switches SW3~SW6. For example, when the charging voltage VCH is equal to a first pre-determined value (e.g. 5V), the controller 145 turns on the switch SW3. Therefore, the reference current Iref1 passes through the input terminal ND3. At this time, the boost voltage VAR may be equal to a first set value. In another embodiment, when the charging voltage VCH is equal to a second pre-determined value (e.g. 9V), the controller 145 turns on the switch SW4. Therefore, the reference current Iref2 passes through the input terminal ND3. At this time, the boost voltage VAR may be equal to a second set value. In some embodiments, when the charging voltage VCH is equal to a third pre-determined value (e.g. 15V) or a fourth pre-determined value (e.g. 20V), the controller 145 turns on the switch SW5 or SW6. Therefore, the reference current Iref3 or Iref4 passes through the input terminal ND3. At this time, the boost voltage VAR may be equal to a third set value or a fourth set value. In one embodiment, the first, second, third and fourth set values are different.

FIG. 4A is a schematic diagram of another exemplary embodiment of a processor, according to various aspects of the present disclosure. In this embodiment, the processor 400A includes energy accumulators Cout1 and Cout2 and a switch Q31. The energy accumulator Cout1 is coupled between the nodes ND1 and GND. The switch Q31 is coupled between the energy accumulators Cout1 and Cout2. In this embodiment, the switch Q31 is a P-type transistor. The gate of the P-type transistor receives a control signal SC. The source of the P-type transistor is coupled to the energy accumulator Cout1. The drain of the P-type transistor is coupled to the energy accumulator Cout2. In some embodiments, the switch Q31 is an N-type transistor. The energy accumulator Cout2 is coupled between the switch Q31 and the node GND. In one embodiment, the energy accumulators Cout1 and Cout2 are capacitors.

In a first mode, the control signal SC is deactivated. Therefore, the switch Q31 is turned off. At this time, only the energy accumulator Cout1 stores energy. The energy W3 stored in the energy accumulator Cout1 is expressed by the following equation (4):

$$W3 = \tfrac{1}{2} \times Cout1 \times V^2 \qquad (4)$$

Therefore, the voltage regulator 143 shown in FIG. 1 generates the operation voltage VOP according to the energy W3 stored in the energy accumulator Cout1.

In a second mode, the control signal SC is activated such that the switch Q31 is turned on. The energy accumulator Cout2 is connected to the energy accumulator Cout1 in parallel. Therefore, the energy accumulators Cout1 and Cout2 store energy together. The sum W4 of the energy stored in the energy accumulators Cout1 and Cout2 is expressed by the following equation (5):

$$W4 = \tfrac{1}{2} \times Cout1 + Cout2) \times V^2 \qquad (5)$$

According to equations (4) and (5), the sum W4 of the energy stored in the energy accumulators Cout1 and Cout2 is higher than the energy stored in the energy accumulator Cout1. Therefore, when the peripheral device 120 stops providing power to the energy regulation circuit 140, the voltage regulator 143 generates the operation voltage VOP according to the sum W4 of the energy stored in the energy accumulators Cout1 and Cout2 to maintain the operation of the controller 145. The energy regulation circuit 140 use a first portion of the energy stored in the energy accumulators Cout1 and Cout2 to maintain the operation of the controller 145 and use a second portion of the energy stored in the energy accumulators Cout1 and Cout2 to provide power to other peripheral devices. In one embodiment, the control signal SC is generated by the controller 145 shown in FIG. 1.

FIG. 4B is a schematic diagram of another exemplary embodiment of a processor, according to various aspects of the present disclosure. FIG. 4B is similar to FIG. 4A with the exception that the processor 400B shown in FIG. 4B further includes a slow start circuit 410. The slow start circuit 410 is configured to avoid an inrush current entering the energy accumulator Cout2 in the moment of turning on the switch Q31. The slow start circuit 410 is coupled between the energy accumulators Cout1 and Cout2. When the switch Q31 is turned on, the current passing into the energy accumulator Cout2 is gradually increased. In the present disclosure, the circuit structure of the slow start circuit 410 is not limited. Any circuit can serve as the slow start circuit 410, as long as the circuit is capable of cancelling the inrush current.

Figure 5:
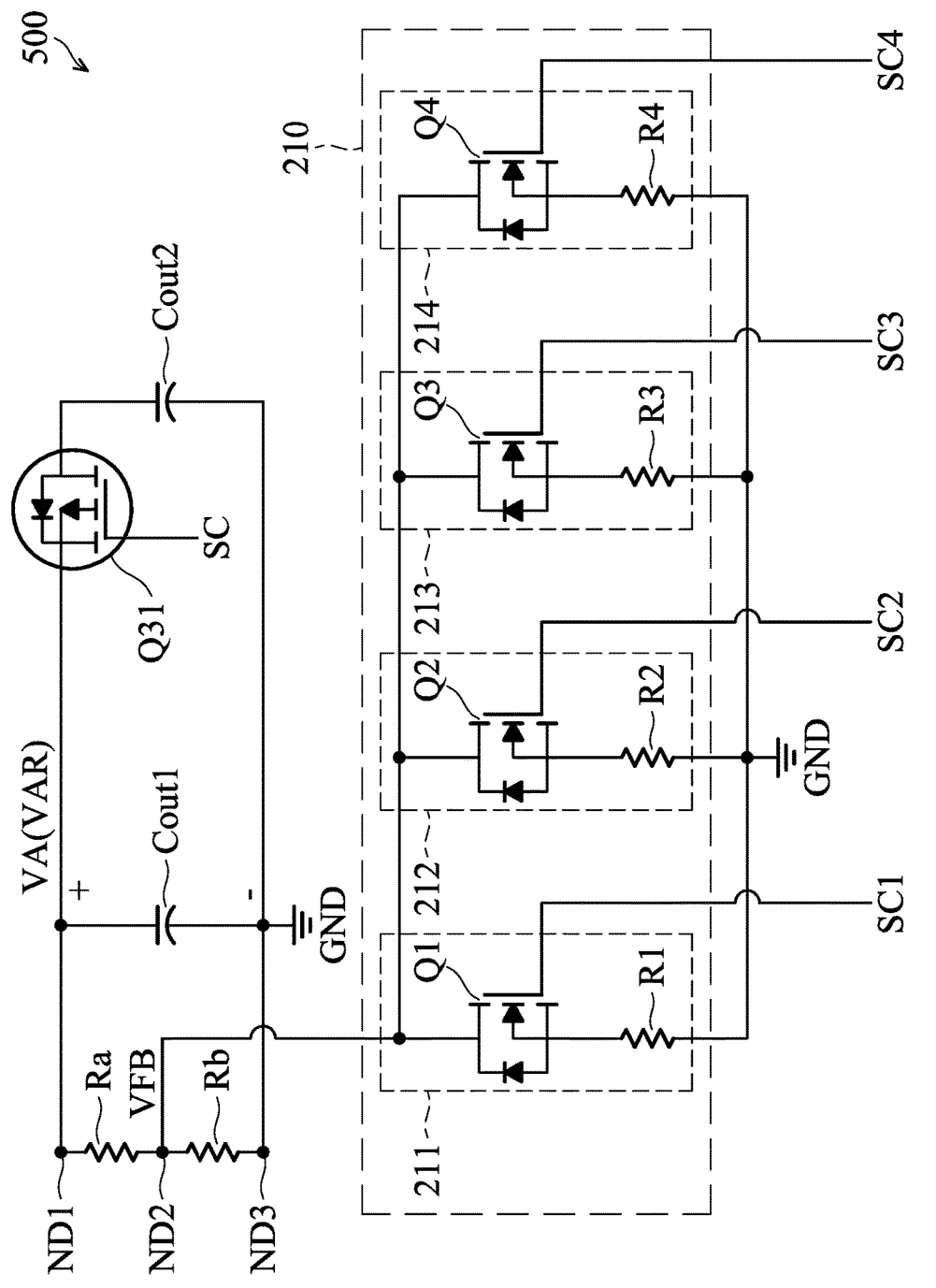
FIG. 5 is a schematic diagram of another exemplary embodiment of a processor, according to various aspects of the present disclosure.

FIG. 5 is a schematic diagram of another exemplary embodiment of a processor, according to various aspects of the present disclosure. The processor 500 includes the processors 200 and 400A. As shown in FIG. 5, the processor 500 includes resistors Ra and Rb, energy accumulators Cout1 and Cout2, a switch Q31 and an adjustment circuit 210. Since the resistors Ra and Rb and the adjustment circuit 210 shown in FIG. 5 are the same as the resistors Ra and Rb and the adjustment circuit 210 shown in FIG. 2, the descriptions of the resistors Ra and Rb and the adjustment circuit 210 shown in FIG. 5 are omitted. Additionally, the features of the energy accumulators Cout1 and Cout2 and the switch Q31 shown in FIG. 5 are the same as the features of the energy accumulators Cout1 and Cout2 and the switch Q31 shown in FIG. 4A, the descriptions relating to the energy accumulators Cout1 and Cout2 and the switch Q31 shown in FIG. 5 are omitted. In some embodiments, the slow start circuit 410 shown in FIG. 4B is applied in FIG. 5.

In a first mode, the control signals SC and SC1~SC4 are deactivated. Therefore, the switch Q31 and the regulators 211~214 are turned off. At this time, the energy W5 stored in the energy accumulator Cout1 is expressed by the following equation (6):

$$W5 = \tfrac{1}{2} \times Cout1 \times VA^2 \qquad (6)$$

In a second mode, the control signal SC is activated. Therefore, the switch Q31 is turned on. The energy accumulator Cout2 is connected to the energy accumulator Cout1 in parallel. At this time, when the control signal SC1 is activated, the feedback voltage VFB is increased to generate a boost voltage VAR. At this time, the sum W6 of the energy stored in the energy accumulators Cout1 and Cout2 is expressed by the following equation (7):

$$W6 = \tfrac{1}{2} \times (Cout1 + Cout2) \times VAR^2 \qquad (7)$$

According to equations (6) and (7), the sum W6 of the energy stored in the energy accumulators Cout1 and Cout2 in the second mode is higher than the energy W5 stored in the energy accumulator Cout1 in the first mode.

Figure 6:
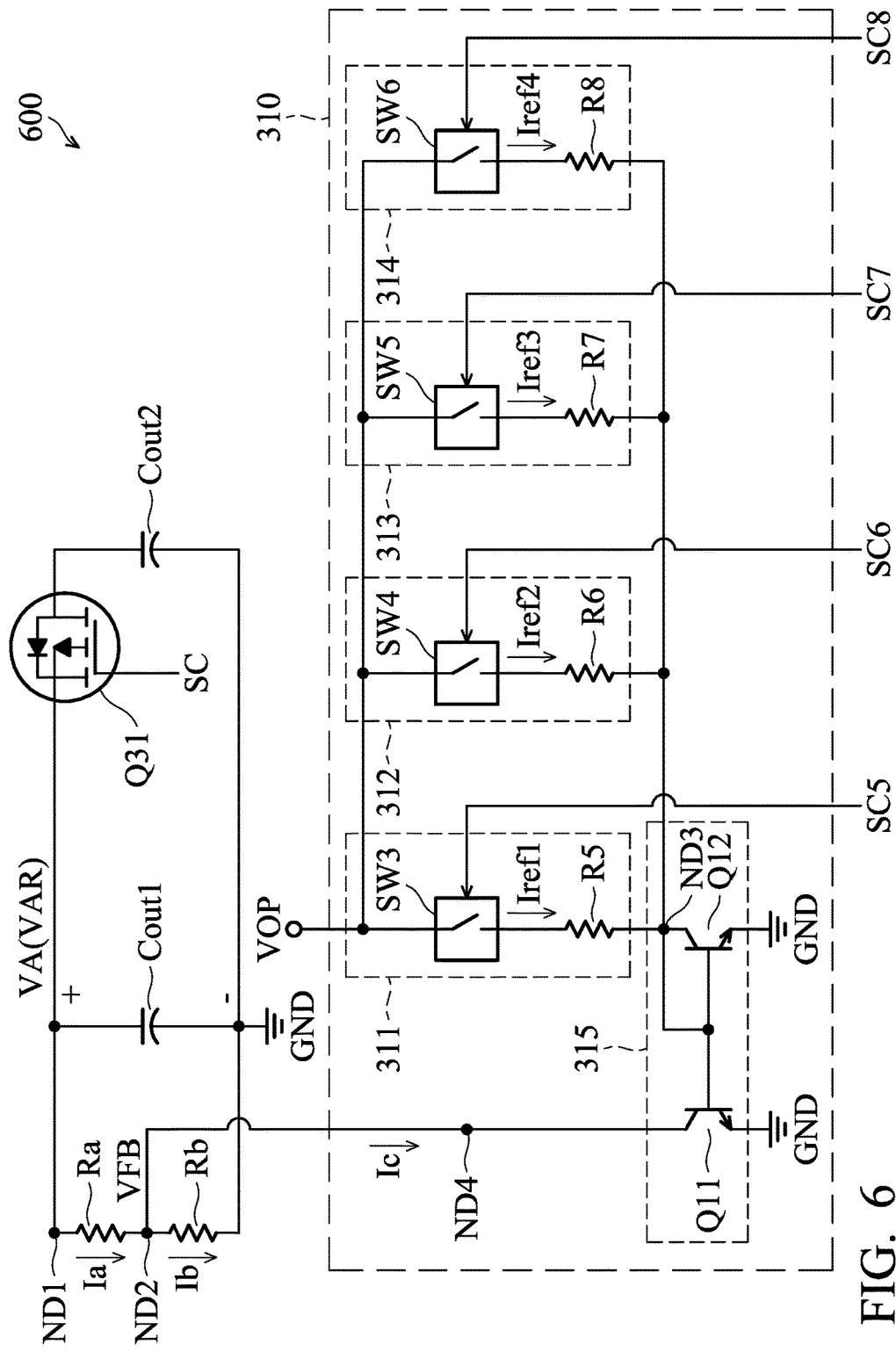
FIG. 6 is a schematic diagram of another exemplary embodiment of a processor, according to various aspects of the present disclosure.

FIG. 6 is a schematic diagram of another exemplary embodiment of a processor, according to various aspects of the present disclosure. The processor 600 includes the processors 300 and 400. As shown in FIG. 6, the processor 600 includes resistors Ra and Rb, energy accumulators Cout1 and Cout2, a switch Q31 and an adjustment circuit 310. Since the resistors Ra and Rb and the adjustment circuit 310 shown in FIG. 6 are the same as the resistors Ra and Rb and the adjustment circuit 310 shown in FIG. 3, the descriptions of the resistors Ra and Rb and the adjustment circuit 310 shown in FIG. 6 are omitted. Additionally, the features of the energy accumulators Cout1 and Cout2 and the switch Q31 shown in FIG. 6 are the same as the features of the energy accumulators Cout1 and Cout2 and the switch Q31 shown in FIG. 4A, the descriptions relating to the energy accumulators Cout1 and Cout2 and the switch Q31 shown in FIG. 6 are omitted. In some embodiments, the slow start circuit 410 shown in FIG. 4B is applied in FIG. 6.

Figure 7:
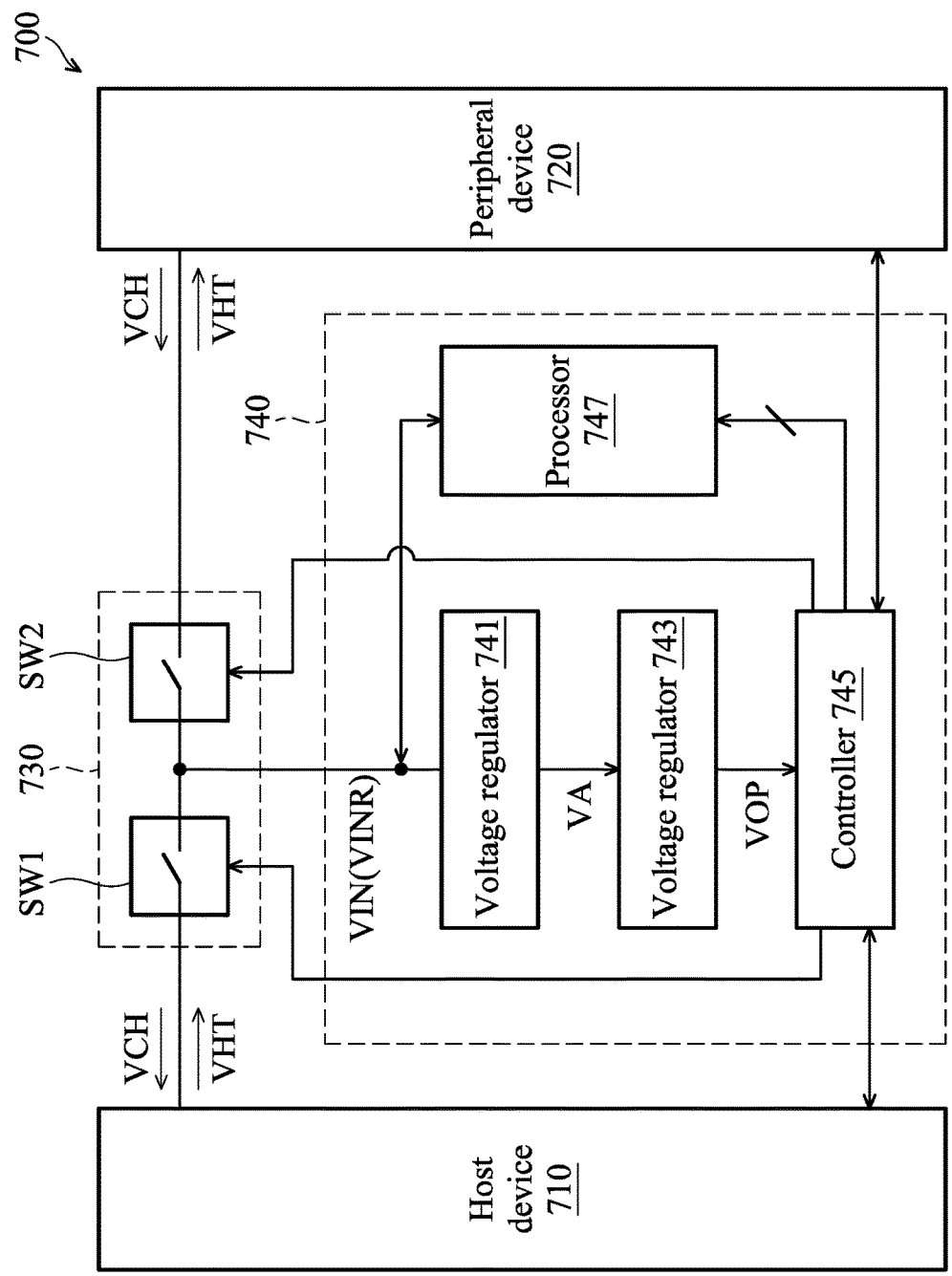
FIG. 7 is a schematic diagram of another exemplary embodiment of an operation system, according to various aspects of the present disclosure.

FIG. 7 is a schematic diagram of another exemplary embodiment of an operation system, according to various aspects of the present disclosure. FIG. 7 is similar to FIG. 1 with the exception that the processor 747 of the operation system 700 shown in FIG. 7 processes an input voltage VIN to generate a processed result VINR. In this embodiment, the controller 745 generates at least one control signal (not shown in FIG. 7) to the processor 747 according to the input voltage VIN. The processor 747 generates an appropriate processed result VINR according to the control signal. The voltage regulator 741 generates an adjustment voltage VA according to the processed result VINR. The voltage regulator 743 generates an operation voltage VOP to the controller 745 according to the adjustment voltage VA.

In one embodiment, the method utilized by the processor 747 for processing the input voltage VIN is the same as the method utilized by the processor 200 shown in FIG. 2, the processor 300 shown in FIG. 3, the processor 400A shown in FIG. 4A, the processor 400B shown in FIG. 4B, the processor 500 shown in FIG. 5 or the processor 600 shown in FIG. 6 for processing the adjustment voltage VA. The method utilized by the processor 747 for processing the input voltage VIN is omitted. Furthermore, the operations of the host device 710, the peripheral device 720, the transmission path 730, the voltage regulators 741 and 743, the controller 745 and the processor 747 of FIG. 7 are the same as the operations of the host device 110, the peripheral device 120, the transmission path 130, the voltage regulators 141 and 143, the controller 145 and the processor 147 of FIG. 1. Therefore, the description of the operations of the host device 710, the peripheral device 720, the transmission path 730, the voltage regulators 741 and 743, the controller 745 and the processor 747 are omitted.

When a charger is coupled to the energy regulation circuit, the energy regulation circuit starts store large energy. When the charger is not coupled to the energy regulation circuit, since the host device needs a long time to provide a host voltage, the energy regulation circuit maintains its operation and/or the operations of other peripheral devices coupled to the energy regulation circuit according to the previous stored energy until the host device provides the host voltage. Therefore, the energy regulation circuit is still capable of communicating with other loads, such as storage devices or display devices, which need large power even if a charging voltage or the host voltage has not been received by the energy regulation circuit.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. An energy regulation circuit coupled to a transmission path and comprising:
a first voltage regulator adjusting an input voltage to generate an adjustment voltage;
a first energy accumulator charged according to the input voltage or the adjustment voltage;
a first switch coupled to the first energy accumulator;
a second energy accumulator coupled to the first switch, wherein when the first switch is turned on, the second energy accumulator is connected to the first energy accumulator in parallel;
a second voltage regulator configured to generate an operation voltage according to a voltage stored in the first energy accumulator when the first switch is turned off, and configured to generate the operation voltage according to a sum of the voltage stored in the first energy accumulator and a voltage stored in the second energy accumulator when the first switch is turned on; and
a controller communicating with a host device and a peripheral device according to the operation voltage, wherein the controller controls the first switch,
wherein:
responsive to the peripheral device is a charger, the controller controls the transmission path to transmit a charging voltage provided by the charger to the host device, and
responsive to the peripheral device is not the charger, the controller controls the transmission path to transmit a host voltage provided by the host device to the peripheral device.

2. The energy regulation circuit as claimed in claim 1, wherein one of the first voltage regulator and the second voltage regulator is a boost circuit, and the other is a buck circuit.

3. The energy regulation circuit as claimed in claim 1, further comprising:
a slow start circuit coupled between the first and second energy accumulators, wherein when the first switch is turned on, a current passing into the second energy accumulator is increased.

4. The energy regulation circuit as claimed in claim 1, wherein when the input voltage is provided by the charger, the controller turns on the first switch, and when the input voltage is not provided by the charger, the controller turns off the first switch.

5. The energy regulation circuit as claimed in claim 4, further comprising:
a first resistor coupled between a first node and a second node; and
a second resistor coupled between the second node and a third node, wherein the first energy accumulator is coupled between the first and third nodes.

6. The energy regulation circuit as claimed in claim 5, further comprising:
a second switch coupled to the second node;
a first set resistor coupled between the second switch and the third node, wherein when the second switch is turned on, the first set resistor is connected to the second resistor in parallel;
a third switch coupled to the second node, wherein the controller controls the second switch and the third switch; and a second set resistor coupled between the third switch and the third node, wherein when the third switch is turned on, the second set resistor is connected to the second resistor in parallel.

7. The energy regulation circuit as claimed in claim 6, wherein when the input voltage is equal to a first pre-determined value, the controller turns on the second switch, and when the input voltage is equal to a second pre-determined value, the controller turns on the third switch.

8. The energy regulation circuit as claimed in claim 5, further comprising:
   a current mirror comprising an input terminal and an output terminal coupled to the second node, wherein when a first reference current passes through the input terminal, the current mirror copies the first reference current to generate a first output current passing through the output terminal, and when a second reference current passes through the input terminal, the current mirror copies the second reference current to generate a second output current passing through the output terminal;
   a first set resistor coupled to the input terminal;
   a second switch receiving the operation voltage and coupled to the first set resistor, wherein when the second switch is turned on, the first reference current passes through the first set resistor and the input terminal;
   a second set resistor coupled to the input terminal; and
   a third switch receiving the operation voltage and coupled to the second set resistor, wherein when the third switch is turned on, the second reference current passes through the second set resistor and the input terminal.

9. The energy regulation circuit as claimed in claim 8, wherein when the input voltage is equal to a first pre-determined value, the controller turns on the second switch, and when the input voltage is equal to a second pre-determined value, the controller turns on the third switch.

10. An operation system comprising:
    a host device configured to provide a host voltage or receive a charging voltage;
    a peripheral device configured to receive the host voltage or provide the charging voltage;
    a transmission path coupled between the host device and the peripheral device to transmit the host voltage or the charging voltage; and
    an energy regulation circuit coupled between the host device and the peripheral device and comprising:
    a first voltage regulator adjusting the charging voltage to generate an adjustment voltage;
    a first energy accumulator charged according to the charging voltage or the adjustment voltage;
    a first switch coupled to the first energy accumulator;
    a second energy accumulator coupled to the first switch, wherein when the first switch is turned on, the second energy accumulator is connected to the first energy accumulator in parallel;
    a second voltage regulator configured to generate an operation voltage according to a voltage stored in the first energy accumulator when the first switch is turned off, and configured to generate the operation voltage according to a sum of the voltage stored in the first energy accumulator and a voltage stored in the second energy accumulator when the first switch is turned on; and
    a controller operating according to the operation voltage, wherein the controller controls the first switch, wherein:

responsive to the peripheral device is a charger, the transmission path transmits the charging voltage provided by the charger to the host device, and
responsive to the peripheral device is not the charger, the transmission path transmits the host voltage provided by the host device to the peripheral device.

11. The operation system as claimed in claim 10, wherein one of the first voltage regulator and the second voltage regulator is a boost circuit, and the other is a buck circuit.

12. The operation system as claimed in claim 10, further comprising:
    a slow start circuit coupled between the first and second energy accumulators, wherein when the first switch is turned on, a current passing into the second energy accumulator is increased.

13. The operation system as claimed in claim 10, wherein when the charging voltage is provided by the charger, the controller turns on the first switch, and when the charging voltage is not provided by the charger, the controller turns off the first switch.

14. The operation system as claimed in claim 13, further comprising:
    a first resistor coupled between a first node and a second node; and
    a second resistor coupled between the second node and a third node, wherein the first energy accumulator is coupled between the first and third nodes.

15. The operation system as claimed in claim 14, further comprising:
    a second switch coupled to the second node;
    a first set resistor coupled between the second switch and the third node, wherein when the second switch is turned on, the first set resistor is connected to the second resistor in parallel;
    a third switch coupled to the second node, wherein the controller controls the second switch and the third switch; and
    a second set resistor coupled between the third switch and the third node, wherein when the third switch is turned on, the second set resistor is connected to the second resistor in parallel.

16. The operation system as claimed in claim 15, wherein when the charging voltage is equal to a first pre-determined value, the controller turns on the second switch, and when the charging voltage is equal to a second pre-determined value, the controller turns on the third switch.

17. The operation system as claimed in claim 14, further comprising:
    a current mirror comprising an input terminal and an output terminal coupled to the second node, wherein when a first reference current passes through the input terminal, the current mirror copies the first reference current to generate a first output current passing through the output terminal, and when a second reference current passes through the input terminal, the current mirror copies the second reference current to generate a second output current passing through the output terminal;
    a first set resistor coupled to the input terminal;
    a second switch receiving the operation voltage and coupled to the first set resistor, wherein when the second switch is turned on, the first reference current passes through the first set resistor and the input terminal;
    a second set resistor coupled to the input terminal; and
    a third switch receiving the operation voltage and coupled to the second set resistor, wherein when the third switch is turned on, the second reference current passes through the second set resistor and the input terminal.

18. The operation system as claimed in claim 17, wherein when the charging voltage is equal to a first pre-determined value, the controller turns on the second switch, and when the charging voltage is equal to a second pre-determined value, the controller turns on the third switch.

* * * * *